(12) United States Patent
Nguyen

(10) Patent No.: US 8,055,914 B2
(45) Date of Patent: *Nov. 8, 2011

(54) VOLTAGE REGULATION FOR A COMPUTER SYSTEM PROVIDING VOLTAGE POSITIONING FOR MULTI-COMPONENT LOAD

(75) Inventor: Don J. Nguyen, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 927 days.

This patent is subject to a terminal disclaimer.

(21) Appl. No.: 11/495,068

(22) Filed: Jul. 28, 2006

(65) Prior Publication Data

US 2006/0265614 A1  Nov. 23, 2006

Related U.S. Application Data

(63) Continuation-in-part of application No. 11/026,649, filed on Dec. 31, 2004, now abandoned, which is a continuation of application No. 09/940,282, filed on Aug. 27, 2001, now Pat. No. 6,839,854.

(51) Int. Cl.
*G06F 1/26* (2006.01)
(52) U.S. Cl. .................................. 713/300; 323/285
(58) Field of Classification Search .................. 713/300; 323/282, 285
See application file for complete search history.

(56) References Cited

U.S. PATENT DOCUMENTS

| | | | |
|---|---|---|---|
| 5,481,178 A | 1/1996 | Wilcox et al. | |
| 5,629,608 A | 5/1997 | Budelman | |
| 5,919,262 A | 7/1999 | Kikinis et al. | |
| 5,926,394 A | 7/1999 | Nguyen et al. | |
| 5,945,817 A * | 8/1999 | Nguyen | 323/273 |
| 5,963,023 A | 10/1999 | Herrell et al. | |
| 6,229,292 B1 | 5/2001 | Redl et al. | |
| 6,243,821 B1 | 6/2001 | Reneris | |
| 6,472,856 B2 * | 10/2002 | Groom et al. | 323/284 |
| 6,697,952 B1 | 2/2004 | King | |
| 7,317,306 B2 * | 1/2008 | Fite | 323/284 |
| 2003/0014675 A1 | 1/2003 | Lee | |
| 2005/0046400 A1 * | 3/2005 | Rotem | 323/234 |

OTHER PUBLICATIONS

Intersil, "HIP6500B-Multiple Linear Power Controller with ACPI Control Interface", Data Sheet File No. 4870, May 2000.
National Semiconductor, "Using Dynamic Voltage Positioning to Reduce the Number of Output Capacitors in Microprocessor Power Supplies", Application Note 1145, Jul. 2000.
Non-Final Office Action for U.S. Appl. No. 09/940,282 Mailed Jul. 14, 2004, 7 pages.
Notice of Allowance and Fees for U.S. Appl. No. 09/940,282 Mailed Sep. 3, 2004, 7 pages.

(Continued)

*Primary Examiner* — Albert Wang
(74) *Attorney, Agent, or Firm* — Blakely, Sokoloff, Taylor & Zafman LLP

(57) ABSTRACT

A computer system has a controller and a voltage regulator. The controller generates a power consumption state signal for one or more components of the computer system to the voltage regulator. The voltage regulator supplies a first voltage level for the one or more components when the one or more components are at a first power consumption state. The voltage regulator increases to a second voltage level for the one or more components when the one or more components enter a second power consumption state.

27 Claims, 6 Drawing Sheets

OTHER PUBLICATIONS

Non-Final Office Action for U.S. Appl. No. 11/026,649 Mailed Jul. 21, 2006, 6 pages.
Non-Final Office Action for German Patent Application No. 102971587 Mailed Dec. 30, 2004, 3 pages.
Non-Final Office Action for Great Britain Patent Application No. GB0404080.4 Mailed Nov. 8, 2004, 1 page.
Non-Final Office Action for Great Britain Patent Application No. GB0404080.4 Mailed Mar. 24, 2005, 1 page
Non-Final Office Action for Great Britain Patent Application No. GB0404080.4 Mailed Jun. 29, 2005, 2 page.
International Preliminary Examination Report for PCT Application No. PCT/US02/27429 Mailed Aug. 13, 2004, 4 pages.
PCT Written Opinion for PCT Application No. PCT/US02/27429 Mailed Aug. 5, 2004, 5 pages.
International Search Report for PCT Application No. PCT/US02/27429 Mailed Apr. 14, 2004, 6 pages.
Non-Final Office Action for Chinese Patent Application No. 02816864.X Mailed Sep. 9, 2005, 8 pages.
Non-Final Office Action for German Patent Application No. 102971587 Mailed May 20, 2005, 2 pages.

* cited by examiner

VOLTAGE REGULATION FOR A COMPUTER SYSTEM PROVIDING VOLTAGE POSITIONING FOR MULTI-COMPONENT LOAD

RELATED APPLICATIONS

This application is a continuation-in-part application of, and claims priority and incorporates by reference, the U.S. application Ser. No. 11/026,649 filed on Dec. 31, 2004, entitled "SYSTEM-LEVEL IMVP FOR LOAD REGULATION", which is a continuation application of, and incorporates by reference, the U.S. application Ser. No. 09/940,282, filed Aug. 27, 2001 entitled "VOLTAGE REGULATION FOR COMPUTER SYTEM COMPONENTS THAT INCREASE VOLTAGE LEVEL WHEN A COMPONENT ENTERS A SLEEP STATE AS INDICATED BY A POWER STATE STATUS SIGNAL", and issued as U.S. Pat. No. 6,839,854 on Jan. 4, 2005, and claims priority thereto.

TECHNICAL FIELD

The present invention relates to computer systems and more particularly to reducing overall transient voltage ranges of a supply voltage from a voltage regulator resulting from variations in the supply current from the voltage regulator.

BACKGROUND

Computer systems, from small handheld electronic devices to medium-sized mobile and desktop systems to large servers and workstations, are becoming increasingly pervasive in our society. Computer systems typically include one or more processors. A processor manipulates and controls the flow of data in a computer by executing instructions. To provide more powerful computer systems for consumers, processor designers strive to continually increase the operating speed of the processor. Unfortunately, as processor speed increases, the power consumed by the processor tends to increase as well. Historically, the power consumed by a computer system has been limited by two factors. First, as power consumption increases, the computer tends to run hotter, leading to thermal dissipation problems. Second, the power consumed by a computer system may tax the limits of the power supply used to keep the system operational, reducing battery life in mobile systems and diminishing reliability while increasing cost in larger systems.

One method of reducing the amount of electric power drawn by a computer system is to design the system such that it is capable of operating in two different modes. In a first mode of operation, only the most vital functions of the system, such as those dedicated to monitoring for user input, are active. This may be referred to as a "sleep mode." During the sleep mode, the computer system draws very little power from the voltage regulator (alternatively referred to as the power/voltage/Vcc supply or power/voltage/Vcc source). In a second mode of operation, the computer system is busy executing instructions to accomplish a particular task. This is referred to as the "wake mode." During the wake mode, the computer system consumes a significant amount of power from the power supply.

Unfortunately, there is a side effect associated with switching a computer system between sleep and wake modes. The rapid change in current drawn from the power supply when the computer switches between modes causes fluctuations in the voltage supplied to the computer by the voltage regulator. Going from a wake mode to a sleep mode may cause a rapid decrease in current, resulting in an upwardly spiking voltage transient. Similarly, going from a sleep mode to a wake mode may cause a rapid increase in current, resulting in a downwardly spiking voltage transient.

BRIEF DESCRIPTION OF THE DRAWINGS

The present invention is illustrated by way of example, and not by way of limitation, in the figures of the accompanying drawings.

DETAILED DESCRIPTION

Figure 1:
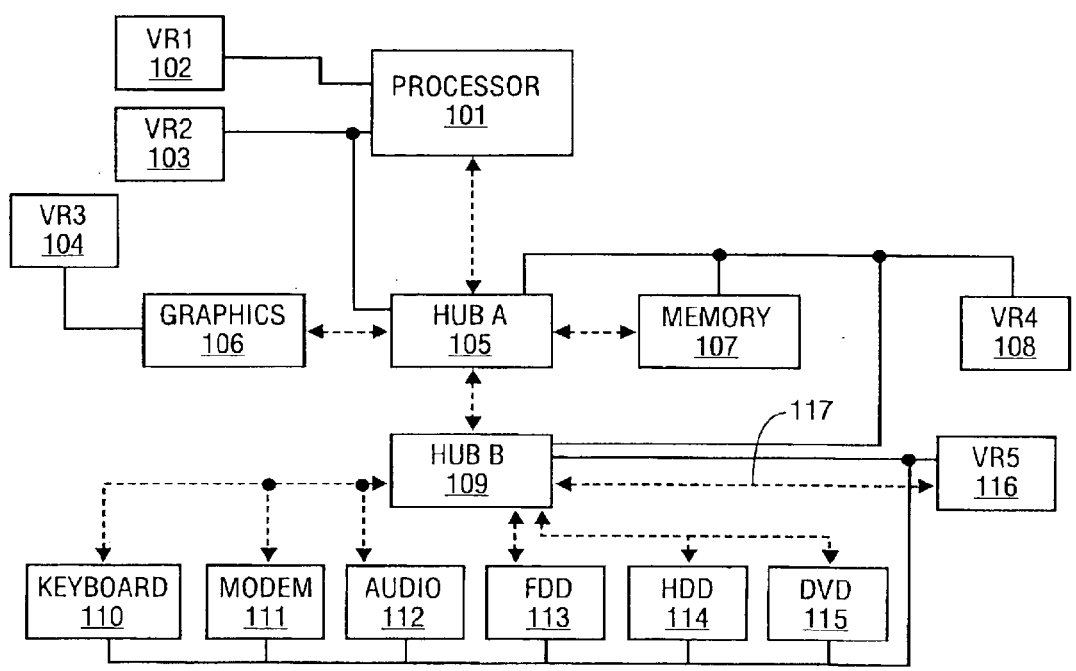
FIG. 1 illustrates a computer system formed in accordance with an embodiment of the present invention.

In accordance with an embodiment of the present invention, a voltage regulator supplies power (alternatively referred to as a voltage level or Vcc level) to multiple devices within a computer system. The voltage level from the voltage regulator may be maintained at a first voltage level that is below the nominal voltage level of the regulator while the devices are in a wake state. In doing so, less power is consumed by the computer system because power consumption is proportional to the square of the voltage level. The voltage level from the voltage regulator may then be increased to a second voltage level when the devices switch to a sleep state. The output of the voltage regulator may be set to an intermediate voltage level, between the first and second voltage levels, when some of the devices are in a wake state and some of the devices are in a sleep state.

Wake and sleep states of the devices are indicated by a power state status signal provided to the voltage regulator. The associated output voltage levels from the voltage regulator are predetermined to be values that will maintain the voltage levels within an appropriate tolerance range despite voltage transients. These voltage transients are the expected result of current fluctuations associated with transitions between wake and sleep states of the devices. A more detailed description of embodiments of the present invention, including various configurations and implementations, is provided below.

As used herein, the terms "wake" and "sleep" are relative indications of the power state of a device. A device in a wake state may generally consume more power, on average, than the same device in a sleep state. In accordance with one embodiment of the present invention, a device in a wake state is either in an operational state or is ready for operation (i.e. receiving, transmitting, or accessing data or ready to receive, transmit, or access data). A device in a sleep state is in a non-operational state. For example, a hard drive, floppy drive, or DVD may be considered to be in a wake state while it's storage medium is spinning and in a sleep state while it's storage medium is not spinning (or is spinning at a speed that is less than a predetermined speed).

For one embodiment of the present invention, the terms "wake" and "sleep" may be interpreted in accordance with the ACPI specification (Advanced Configuration and Power Interface Specification, Rev. 2.0, published Jul. 27, 2000, by Compaq, Intel, Microsoft, Phoenix, and Toshiba), but is not to be so limited. Note that what is referred to herein as a sleep state may alternatively be referred to as an inactive, power-down, deep power-down, deep sleep, low-power, or idle state.

In accordance with one embodiment of the present invention, the power state status signal provided to the voltage regulator to indicate wake and sleep states of the devices in the computer system may be a signal defined by the ACPI specification. For example, the power state status signal may be the SLP_S3# signal, as described in the ACPI specification. Alternatively, the power state status signal may be any signal generated by any controller within the computer system to indicate the power state of individual or multiple devices within the system. This controller may reside centrally within a hub or bridge (often contained in a chipset) of a computer system (as described in more detail below), or, alternatively, it may reside centrally within another device of the computer system, or as a discrete component. In accordance with an alternate embodiment, it may be distributed across multiple devices or discrete components of the computer system. For example, each device coupled to a voltage regulator may send its own power state status signal separately to the voltage regulator to indicate its power state.

It is to be noted that the power state status signal proved to the voltage regulator may indicate a power state change of an associated device (or of multiple devices) before, after, or during the power state transition of the device. As used herein, the term "when" is used to indicate the temporal nature of any of these power state transitions. For example, the phrase "a signal is sent to the voltage regulator when the device enters the sleep state" is to be interpreted to mean that the signal may be sent before, after, or during the transition into the sleep state, but is nonetheless associated with that transition into the sleep state.

FIG. 1 includes a computer system formed in accordance with an embodiment of the present invention. Processor 101 is coupled to Hub A 105 to communicate with memory 107, graphics device 106, and Hub B. Hub B is, in turn, coupled to several peripheral input/output devices, including, for example, keyboard 110, modem 111, audio device 112, floppy disk drive 113, hard disk drive 114, and DVD 115. The computer system of FIG. 1 additionally includes multiple voltage regulators (VRs) to supply power at different voltage levels to the various components of the system. For example, VR1 102 supplies power to processor 101. VR2 103 supplies power to both processor 101 and to Hub A 105. VR3 104 supplies power to graphics device 106. VR4 105 supplies power to Hub A 105, memory 107, and to Hub B 109. VR5 116 also supplies power to Hub B 109 as well as to keyboard 110, modem 111, audio device 112, floppy disk drive 113, hard disk drive 114, and DVD 115.

Note that some voltage regulators supply power to a single component while other voltage regulators supply power to multiple components. In addition, some components receive a voltage supply from only a single voltage regulator while other components receive multiple voltage supplies from multiple voltage regulators. It is to be appreciated that in accordance with alternate embodiments of the present invention, alternate couplings of voltage regulators to these and other components of a computer system may be implemented.

Multiple components of the computer system of FIG. 1 may be capable of entering wake and sleep states. For example, as described above, hard disk drive 114 and DVD 115 may be considered to be in a sleep state when their respective storage mediums are not spinning. Other components, such as processor 101, may have various wake and sleep states. For example, processor 101 may have a fully operational wake state, a partially operational wake state, a partial sleep state, a regular sleep state, a deeper sleep state, etc. These different levels of wake and sleep states may have various current consumption levels associated with them.

In accordance with an embodiment of the present invention, the power state status of the various components of the computer system of FIG. 1 may be indicated to one or more voltage regulators to appropriately set the output voltage levels supplied to the components. The power state status may be provided to a voltage regulator by a power state status signal via a power state status signal line. For example, the power state of peripheral devices 110-115 of FIG. 1 may be indicated to VR5 116 by a power state status signal via power state status signal line 117.

In accordance with one embodiment of the present invention, the power state status signal provided to VR5 116 via signal line 117 of FIG. 1 indicates the power state of multiple ones of peripheral devices 110-115. For example, in accordance with an embodiment in which the power state status signal is the SLP_S3# signal in an ACPI-compliant computer system, the power state status signal may indicate the power state of drives 113-115, collectively. In accordance with an alternate embodiment of the present invention, the power state status signal is a serial or parallel signal that indicates the power state of various components independently, collectively, or in any grouping.

Figure 2:
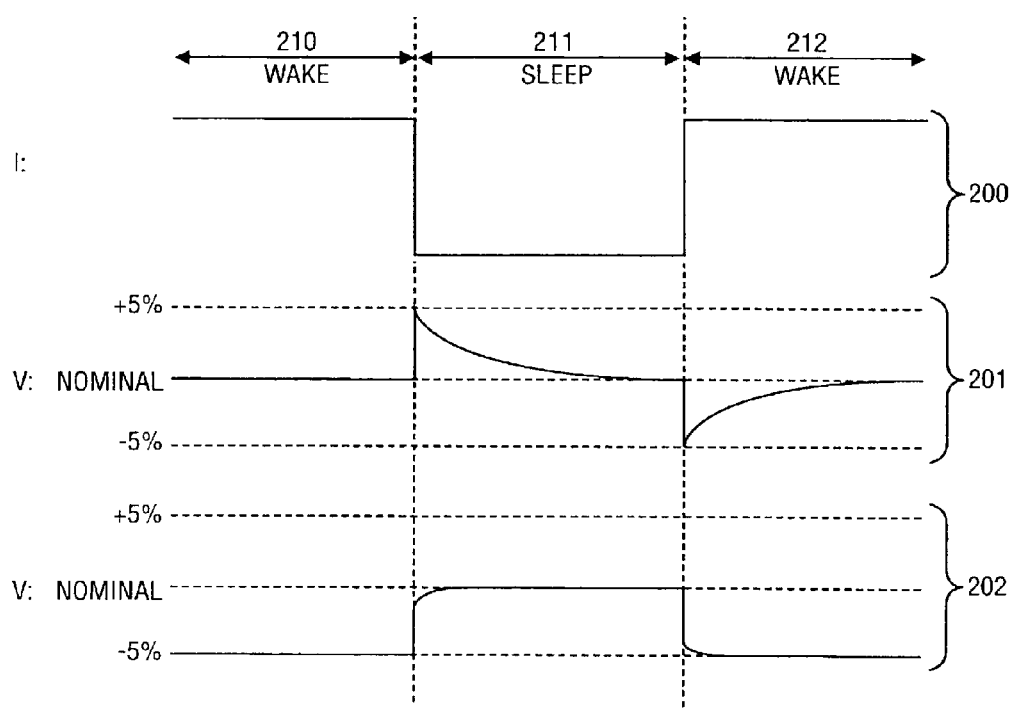
FIG. 2 illustrates a timing diagram in accordance with an embodiment of the present invention.

FIG. 2 includes a timing diagram of the current and voltage from a voltage regulator to a plurality of components of a computer system in accordance with an embodiment of the present invention. The current from the voltage regulator is shown in timing diagram 200. As shown, during period of time 210 in diagram 200, the components powered by the voltage regulator are in a wake state and consume a first amount of current. During period of time 211, the components are in a sleep state and consume a lesser amount of current. During period of time 212, the components reenter the wake state and again consume the first amount of current.

Conventionally, the voltage level output of the voltage regulator is set to the nominal voltage, as shown in timing diagram 201 of FIG. 2. This nominal voltage may be, for example, five volts, but may alternatively be any target voltage sufficient to power the components supplied by the voltage regulator. Typically, there is a tolerance range within which the voltage level output of the voltage regulator may fluctuate while still enabling the associated components to operate properly and allowing the computer system to perform within established electrical, thermal, and other specified limits. As shown in FIG. 2, this tolerance range may be +/−5% of the nominal voltage level. This tolerance range may vary in alternate embodiment of the present invention, and may not necessarily be symmetrical about the nominal voltage level.

When the power state of components of the computer system transitions from a wake state 210 to a sleep state 211, an upwardly spiking voltage transient occurs as shown in timing diagram 201 of FIG. 2. The computer system is designed such that this upwardly spiking voltage transient remains within the tolerance range. When the power state of components of the computer system transitions from a sleep state 211 to a wake state 212, a downwardly spiking voltage transient occurs as shown in timing diagram 201. The computer system is designed such that this downwardly spiking voltage transient remains within the tolerance range.

In accordance with an embodiment of the present invention, a power state status signal is used to regulate the target voltage level from the voltage regulator in a manner that reduces the power consumption of the computer system. For example, as shown in timing diagram 202 of FIG. 2, the voltage level output from the voltage regulator may be set at or near the lower end of the tolerance range while the components are in a wake state during period of time 210, as indicated to the voltage regulator by a power state status signal. For an alternate embodiment of the present invention, this voltage level may be set to any intermediate value between the lower end of the tolerance range and the nominal voltage level during period of time 210. When the components transition to the sleep state during period of time 210, the voltage level output from the voltage regulator may spike up. This transition is indicated to the voltage regulator by the power state status signal.

Instead of dropping back to the initial voltage level, the voltage level target may be reset to a higher value during period of time 211, as shown in timing diagram 202 of FIG. 2. In accordance with one embodiment of the present invention, this higher value may be at or near the nominal voltage level. In accordance with an alternate embodiment of the present invention, this voltage level may be at or near a voltage level that can accommodate a downwardly spiking voltage transient without allowing the voltage level to fall below the lower end of the tolerance range.

As shown in timing diagram 202 of FIG. 2, when the components transition back to the wake state during period of time 212, as indicated by a power state status signal to the voltage regulator, the voltage level output from the voltage regulator may spike down, but remains within the tolerance range. Instead of dropping back to the voltage level set during period of time 211, the voltage level target may be reset to a different value during period of time 212. As shown in timing diagram 202, this value may be the initial voltage level set during wake period 210, near the lower end of the tolerance range.

Figure 3:
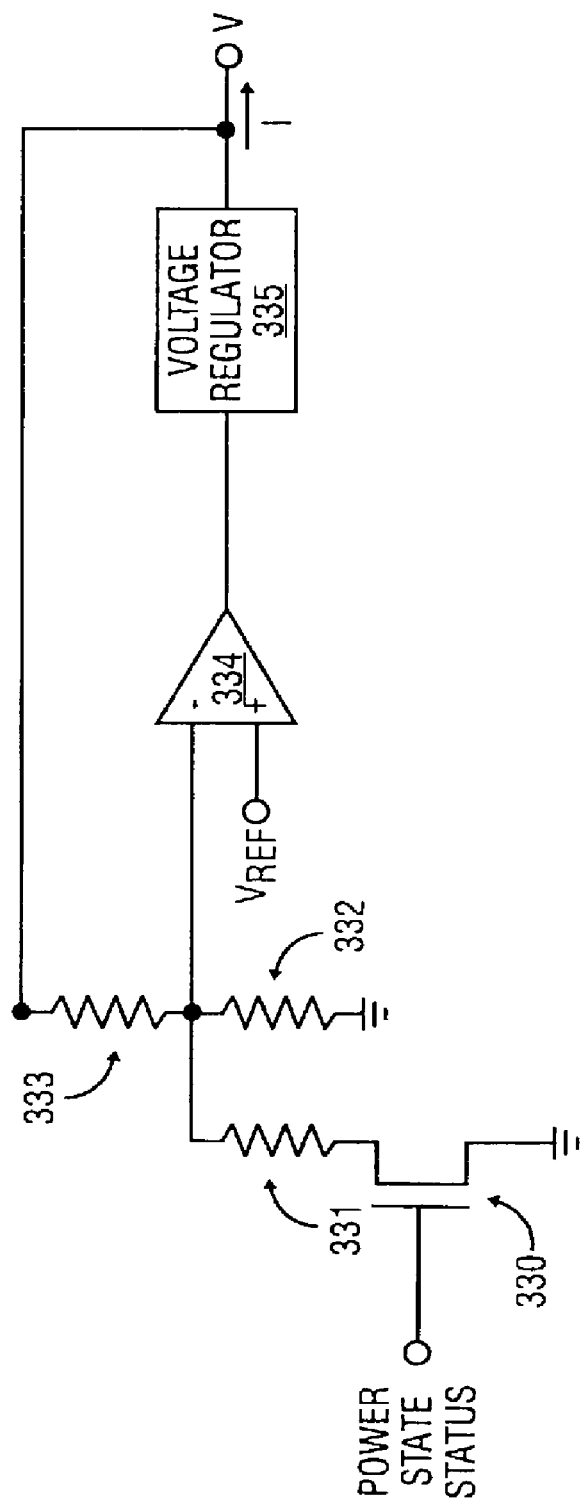
FIG. 3 illustrates a circuit in accordance with an embodiment of the present invention.

FIG. 3 includes a circuit in accordance with an embodiment of the present invention. The circuit of FIG. 3 is the voltage regulator that supplies power to a computer system formed in accordance with an embodiment of the present invention. The power state status signal may be coupled to the gate of n-channel transistor 330. The source of transistor 330 is coupled to ground while its drain is coupled to one end of resistor 331. The opposite end of resistor 331 is coupled to the inverting input of comparator 334. The non-inverting input to comparator 334 is coupled to a constant reference voltage Vref. The output of comparator 334 is coupled to an input of voltage regulator 335 the output of voltage regulator 335 is fed back to the inverting input of comparator 334 through resistor 333. The inverting input to comparator 334 is coupled to ground through resistor 332.

When the inverting input to comparator 334 of FIG. 3 falls below the reference voltage Vref, the output of comparator 334 sends a signal to voltage regulator 335 to increase the voltage V at its output. Conversely, when the inverting input to comparator 334 is raised above the voltage value Vref, comparator 334 sends a signal to voltage regulator 335 to reduce the voltage V at its output. In this manner, the voltage V supplied by the voltage regulator to the components of the computer system is regulated and held at a relatively constant value. Note that in the interest of clarity, voltage regulator 335 is merely represented in block form. The boundaries of voltage regulator block 335 have been arbitrarily selected in the manner shown to highlight the relationship between the power state status signal and its effect on the output voltage level of the voltage regulator. The voltage regulator of the computer system may alternatively be defined to include any or all of components 330-334. For this reason, it is understood that sending the power state status signal to the gate of transistor 330 is equivalent to stating that the signal is simply sent to the voltage regulator itself.

In accordance with one embodiment of the present invention, Vref is set at or near the lower end of the tolerance range of the voltage regulator. The power state status signal may be driven high to indicate that the associated components of the computer system are in a sleep state, and driven low to indicate that the associated components of the computer system are in a wake state. Alternatively, the circuit of FIG. 3 may be redesigned to accommodate a power state status signal that is driven high to indicate a wake state and driven low to indicate a sleep state.

Alternatively, the circuit of FIG. 3 may be modified to include a storage element, such as a latch, to store one or more bits indicating power state statuses of associated components of the computer system. For another embodiment of the present invention, the circuit of FIG. 3 may be redesigned to accept additional power state status signals associated with other components, the power to which is supplied by voltage regulator 335. For this embodiment, more than two different output voltage levels may be generated by the voltage regulator, as described in more detail below.

In one embodiment, the voltage regulator further comprises a first power transistor to raise the voltage level; and a second power transistor to lower the voltage level. The first power transistor and the second power transistor operate substantially at the same period of time when the one or more components are at the first power consumption state, and wherein the first power transistor and the second power transistor operate independently when the one or more of components are at the second power consumption state. The first power transistor is to be off when all components are at the second power consumption state.

Figure 4:
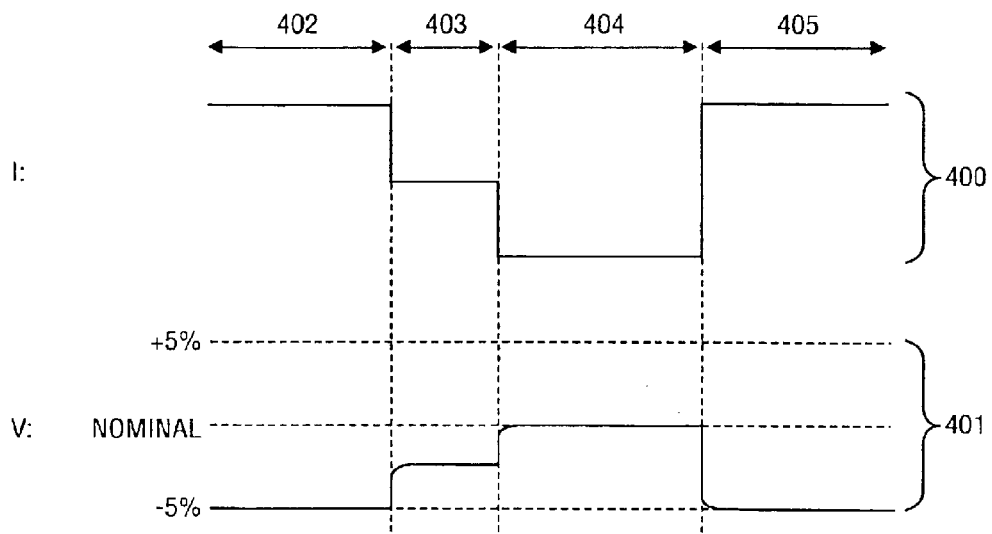
FIG. 4 illustrates a timing diagram in accordance with another embodiment of the present invention.

FIG. 4 includes a timing diagram of the current and voltage from a voltage regulator to a plurality of components of a computer system in accordance with another embodiment of the present invention. The current from the voltage regulator is shown in timing diagram 400. As shown, during period of time 402 in diagram 400, the components powered by the voltage regulator are in a wake state and consume a first amount of current. During period of time 403, some components enter a sleep state and consume a lesser amount of current while other components remain in a wake state, resulting in a total consumption of a second amount of current that is less than the first amount of current. During period of time 404, more components enter the sleep state, resulting in a further decrease in the amount of current consumed. During period of time 405, the components reenter the wake state and again consume the first amount of current.

In accordance with an embodiment of the present invention, a power state status signal is used to regulate the target voltage level from the voltage regulator in a manner that reduces the power consumption of the computer system. For example, as shown in timing diagram 401 of FIG. 4, the voltage level output from the voltage regulator may be set at or near the lower end of the tolerance range while the components are in a wake state during period of time 402, as indicated to the voltage regulator by a power state status signal. This assumes most of the high current drawing components are in the wake state during period of time 402. In accordance with an alternate embodiment of the present invention, this voltage level may be at or near a voltage level that can accommodate a downwardly spiking voltage transient without allowing the voltage level to fall below the lower end of the tolerance range.

When some of the components transition to the sleep state during period of time 403, the voltage level output from the voltage regulator may spike up as shown in timing diagram 401. This transition is indicated to the voltage regulator by the power state status signal.

Instead of dropping back to the initial voltage level, the voltage level target may be reset to a higher value during period of time 403, as shown in timing diagram 401 of FIG. 4. In accordance with one embodiment of the present invention, this higher value may be at some intermediate position between the lower end of the tolerance range and the nominal voltage level. In accordance with an alternate embodiment of the present invention, this voltage level may be at or near a voltage level that can accommodate a downwardly spiking voltage transient without allowing the voltage level to fall below the lower end of the tolerance range. When additional components transition to the sleep state during period of time 404, the voltage level output from the voltage regulator may spike up again, as shown in timing diagram 401. This transition is also indicated to the voltage regulator by the power state status signal.

The voltage level target may again be reset to an even higher value during period of time 404, as shown in timing diagram 401 of FIG. 4. In accordance with one embodiment of the present invention, this higher value may be at or near the nominal voltage level, assuming most of the high current drawing components are in the sleep state during period of time 404. In accordance with an alternate embodiment of the present invention, this voltage level may be at or near a voltage level that can accommodate a downwardly spiking voltage transient without allowing the voltage level to fall below the lower end of the tolerance range.

As shown in timing diagram 401 of FIG. 4, when the components transition back to the wake state during period of time 405, as indicated by a power state status signal to the voltage regulator, the voltage level output from the voltage regulator may spike down, but remains within the tolerance range. Instead of dropping back to the voltage level set during period of time 404, the voltage level target may be again reset to a different value during period of time 405. As shown in timing diagram 401, this value may be the initial voltage level set during wake period 401, near the lower end of the tolerance range, assuming most of the high current drawing components are in the wake state during period of time 405. In accordance with an alternate embodiment of the present invention, this voltage level may be at or near a voltage level that can accommodate a downwardly spiking voltage transient without allowing the voltage level to fall below the lower end of the tolerance range.

Figure 5:
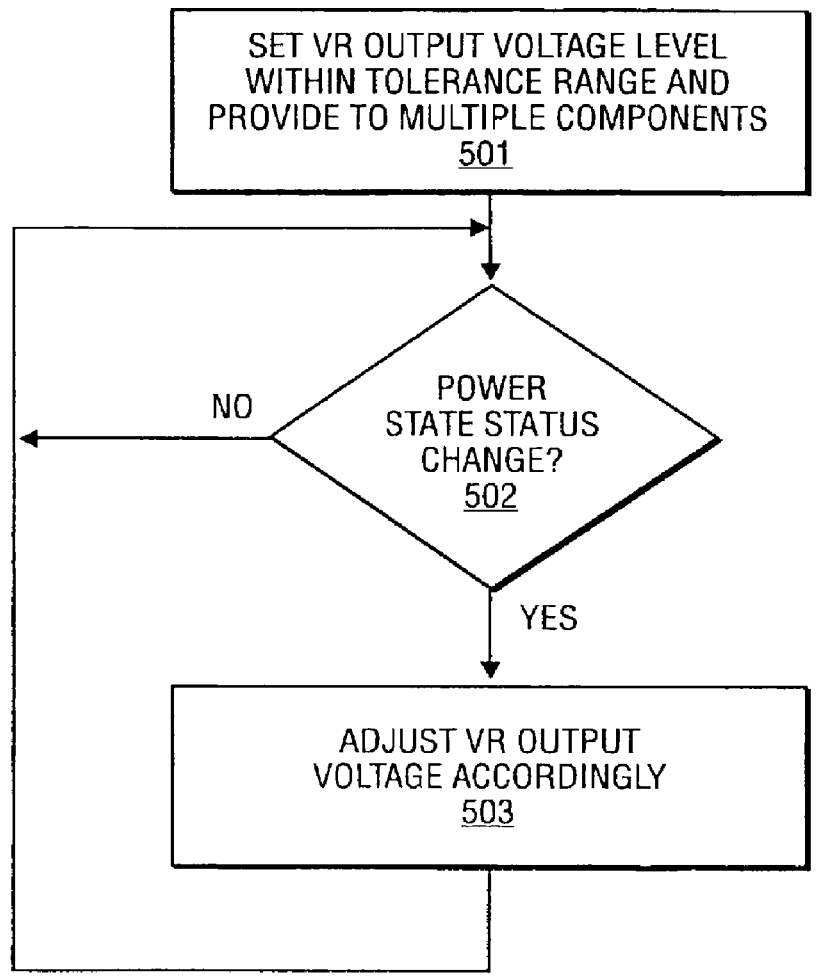
FIG. 5 illustrates a flow chart showing a method in accordance with one embodiment of the present invention.

FIG. 5 includes a flow chart showing a method of the present invention. At step 501, the output of the voltage regulator is set to a voltage level within the tolerance range and is provided to multiple components of a computer system. In accordance with one embodiment of the present invention, this voltage level may be at or near a voltage level that can accommodate a downwardly spiking voltage transient without allowing the voltage level to fall below the lower end of the tolerance range. For one embodiment of the present invention, to reduce power consumption, this voltage level is set below the nominal voltage level.

At step 502, a power state status signal is sent to the voltage regulator indicating that the power state status of one or more components of the computer system has changed. At step 503, the output voltage level of the voltage regulator is adjusted accordingly. That is, in accordance with one embodiment of the present invention, the target output voltage level of the voltage regulator may be raised if the power state status signal indicates that one or more components of the computer system have entered a sleep mode. Similarly, the target output voltage level of the voltage regulator may be lowered if the power state status signal indicates that one or more components of the computer system have entered a wake mode.

Figure 6:
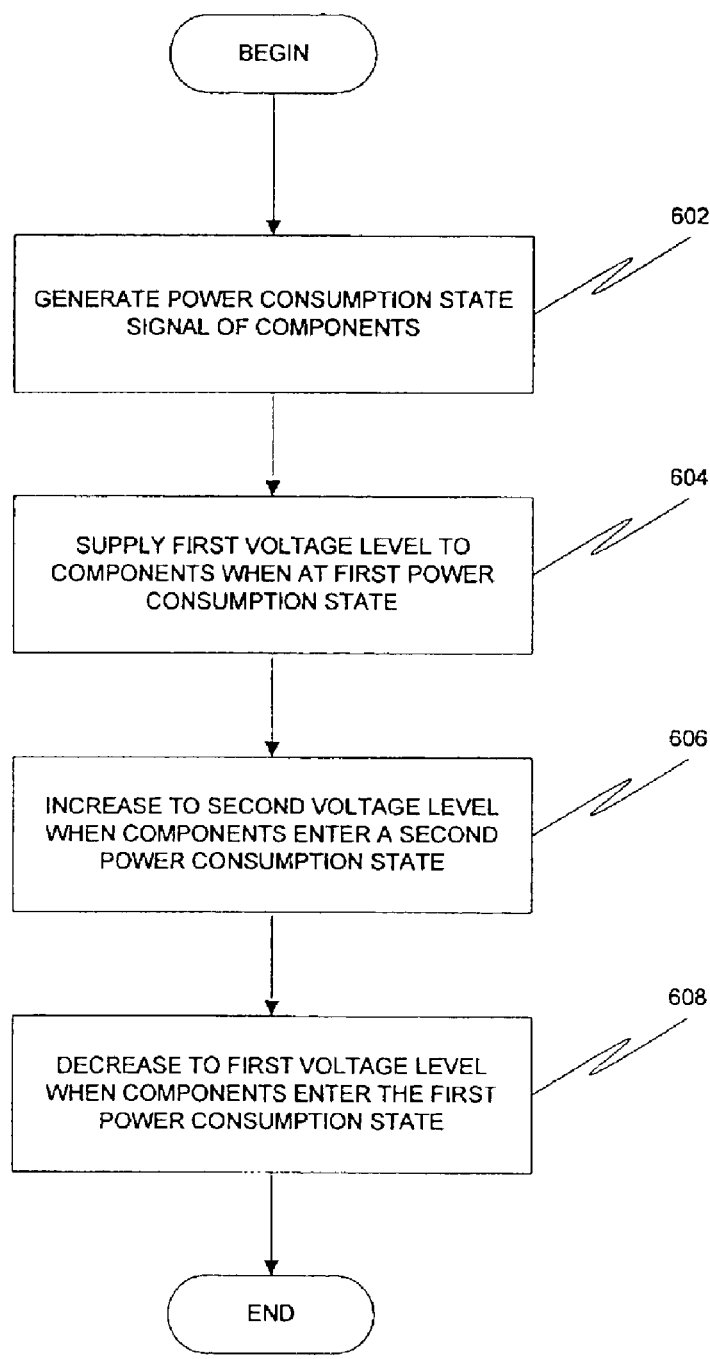
FIG. 6 illustrates a flow chart showing a method in accordance with another embodiment of the present invention.

FIG. 6 illustrates a flow chart showing a method in accordance with another embodiment of the present invention. At 602, a power consumption state signal for one or more components of a computer system is generated. At 604, a first voltage level is supplied to the one or more components when the one or more components are at a first power consumption state. At 606, a voltage regulator increases to a second voltage level supplied to the one or more components when the one or more components enter a second power consumption state. At 608, the voltage regulator decreases from the second voltage level to the first voltage level when the one or more components enter from the second power consumption state to the first power consumption state.

The one or more components consume more power at the first power consumption state than at the second power consumption state. As illustrated in FIG. 2, the first voltage level is below a nominal voltage to power the one or more components. In particular, the first voltage level is within a tolerance range (e.g. 5%) sufficient to power the one or more components. The second voltage level is at about the nominal voltage. As illustrated in FIG. 4, the voltage regulator supplies an increase a third voltage level when a first component remains in the first power consumption state while a second component enters the second power consumption state. As shown at 403, the third voltage level is between the first voltage level at 402 and the second voltage level at 404.

It should be noted that the processor discussed in the present application is not limited to a Central Processing Unit but may include also other similar components such as a chipset. Further, the processor may also be powered by a DC power source. The DC power source may include but is not limited to fuel cells and batteries.

The above discussion is also applicable to components such as Chipsets, hard drive, memory controller hubs, I/O hubs. Further the present embodiment is not just limited to two power consumption states (wake and sleep states) but may include multiple power consumption states. For example, a hard drive may have several power consumption states: an initial spinning, a full power, no spinning, etc.

Although the present invention is described herein with reference to a specific preferred embodiment, many modifications and variations therein will readily occur to those with ordinary skill in the art. Accordingly, all such variations and modifications are included within the intended scope of the present invention as defined by the following claims.

What is claimed is:

1. A computer system comprising:
   a controller to generate a power consumption state signal for a plurality of components of the computer system; and
   a voltage regulator to supply an output voltage of a first voltage level for the plurality of components in response to the power consumption state signal from the controller when the plurality of components are at a first power consumption state, and to increase the output voltage to a second voltage level for the plurality of components in response to the power consumption state signal from the controller when the plurality of components enter a second power consumption state,
   wherein the plurality of components consume more power at the first power consumption state than at the second power consumption state, wherein the voltage regulator is operable to increase the output voltage from the first voltage level to a third voltage level for the plurality of components when a first component of the plurality of components remains at the first power consumption state while a second component of the plurality of components enters the second power consumption state, and wherein the third voltage level is between the first voltage level and the second voltage level.

2. The computer system of claim 1, wherein the first voltage level and the second voltage level are predetermined to be values that will maintain voltages for the plurality of components within a tolerance range in response to voltage transients.

3. The computer system of claim 1, wherein the first voltage level is below a nominal voltage to power the plurality of components.

4. The computer system of claim 1, wherein the first voltage level is within a tolerance range sufficient to power the plurality of components.

5. The computer system of claim 3, wherein the second voltage level is at about the nominal voltage.

6. The computer system of claim 1, wherein the voltage regulator is operable to decrease the output voltage from the second voltage level to the first voltage level when the plurality of components transitions from the second power consumption state to the first power consumption state.

7. The computer system of claim 1, wherein the voltage regulator is operable to increase the output voltage to the third voltage level from the first voltage level when some of the components of the plurality of components remain at the first power consumption state and when some of the components of the plurality of components enter the second power consumption state.

8. The computer system of claim 1, wherein the voltage regulator is to increase the output voltage from the first voltage level to the second voltage level when all of the plurality of components enter the second power consumption state, and to decrease the output voltage from the second or the third voltage levels to the first voltage level when all of the plurality of components enter the first power consumption state.

9. The computer system of claim 1, further comprising:
a power source that supplies DC voltage to the voltage regulator that is solely within the computer system, and needs to be recharged on a periodic basis, wherein the power source includes a fuel cell, and wherein the plurality of components include a hard drive, an audio device, a keyboard, a DVD, and a memory controller hub.

10. A method comprising:
generating a power consumption state signal by a controller for a plurality of components of a computer system;
supplying an output voltage of a first voltage level to the plurality of components when the power consumption state signal indicates that the plurality of components are at a first power consumption state;
increasing the output voltage supplied to the plurality of components to a second voltage level when the power consumption state signal indicates that the plurality of components enter a second power consumption state, wherein the plurality of components consume more power at the first power consumption state than at the second power consumption state; and
increasing the output voltage to a third voltage level for the plurality of components from the first voltage level when a first component of the plurality of components remains at the first power consumption state while a second component of the plurality of components enters the second power consumption state, wherein the third voltage level is between the first voltage level and the second voltage level.

11. The method of claim 10, wherein the first voltage level and the second voltage level are predetermined to be values that will maintain voltages for the plurality of components within a tolerance range in response to voltage transients.

12. The method of claim 10, wherein the first voltage level is below a nominal voltage to power the plurality of components.

13. The method of claim 12, wherein the second voltage level is at about the nominal voltage.

14. The method of claim 10, wherein the first voltage level is within a tolerance range sufficient to power the plurality of components.

15. The method of claim 10, further comprising:
decreasing the output voltage from the second voltage level to the first voltage level when the plurality of components enters the first power consumption state from the second power consumption state.

16. The method of claim 10, wherein
increasing the output voltage to the third voltage level from the first voltage level occurs when some of the components of the plurality of components remain at the first power consumption state and when some of the components of the plurality of components enter the second power consumption state.

17. A non-transitory computer-readable medium storing instructions which when executed by a processor, to cause the processor to perform a method comprising:
generating a power consumption state signal by a controller for a plurality of components of a computer system;
supplying an output voltage of a first voltage level to the plurality of components when the power consumption state signal indicates that the plurality of components are at a first power consumption state;
increasing the output voltage supplied to the plurality of components to a second voltage level when the power consumption state signal indicates that the plurality of components enters a second power consumption state, wherein the plurality of components consume more power at the first power consumption state than at the second power consumption state; and
increasing the output voltage to a third voltage level for the plurality of components from the first voltage level when a first component of the plurality of components remains at the first power consumption state while a second component of the plurality of components enters the second power consumption state, wherein the third voltage level is between the first voltage level and the second voltage level.

18. A voltage regulator comprising:
an input terminal to receive a power consumption state signal from a controller for a plurality of components of a computer system; and
an output terminal to supply an output voltage of a first voltage level for the plurality of components when the power consumption state signal indicates that the plurality of components are at a first power consumption state, and to increase the output voltage to a second voltage level for the plurality of components when the power consumption state signal indicates that the plurality enters a second power consumption state,
wherein the plurality of components consume more power at the first power consumption state than at the second power consumption state wherein the voltage regulator is operable to increase the output voltage to a third voltage level from the first voltage level for the plurality of components when a first component of the plurality of components remains at the first power consumption state while a second component of the plurality of components enters the second power consumption state, and wherein the third voltage level is between the first voltage level and the second voltage level.

19. The voltage regulator of claim 18, wherein the first voltage level and the second voltage level are predetermined to be values that will maintain voltages for the plurality of components within a tolerance range in response to voltage transients.

20. The voltage regulator of claim 18, wherein the first voltage level is below a nominal voltage to power the plurality of components.

21. The voltage regulator of claim 18, wherein the first voltage level is within a tolerance range sufficient to power the plurality of components.

22. The voltage regulator of claim 20, wherein the second voltage level is at about the nominal voltage.

23. The voltage regulator of claim 18, wherein the voltage regulator is operable to decrease the output voltage from the second voltage level to the first voltage level when the plurality of components enters the first power consumption state from the second power consumption state.

24. The voltage regulator of claim 18, wherein the voltage regulator is operable to increase the output voltage to the third voltage level from the first voltage level when some of the components of the plurality of components remain at the first power consumption state and when some of the components of the plurality of components enter the second power consumption state.

25. The voltage regulator of claim 18, further comprising:
a first power transistor to raise the voltage level; and
a second power transistor to lower the voltage level.

26. The voltage regulator of claim 25, wherein the first power transistor and the second power transistor operate substantially at the same period of time when the plurality of components are at the first power consumption state, and wherein the first power transistor and the second power transistor operate independently when the plurality of components are at the second power consumption state.

27. The voltage regulator of claim 26, wherein the first power transistor is to be off when all components of the plurality of components are at the second power consumption state.

* * * * *